United States Patent [19]

Barrett

[11] 4,018,529
[45] Apr. 19, 1977

[54] SPECTROSCOPIC TEMPERATURE MEASUREMENT

[75] Inventor: Joseph J. Barrett, Morris Plains, N.J.

[73] Assignee: Allied Chemical Corporation, Morris Township, N.J.

[22] Filed: June 5, 1975

[21] Appl. No.: 584,085

Related U.S. Application Data

[63] Continuation-in-part of Ser. No. 478,405, June 11, 1974, Pat. No. 3,909,132.

[52] U.S. Cl. .................................... 356/45; 356/75
[51] Int. Cl.$^2$ ........................ G01J 5/60; G01J 3/44
[58] Field of Search ........................ 356/43, 45, 75; 250/226, 574

[56] References Cited

UNITED STATES PATENTS 3,853,404 12/1974 Barrett ................................. 356/75
3,909,132 9/1975 Barrett ................................. 356/45

OTHER PUBLICATIONS

Rieder et al "Second Order Raman Spectra" of RbCl at 80&300° K, Solid State Comm. vol. 13, 1973, pp. 559–562.

Primary Examiner—John K. Corbin
Assistant Examiner—Wm. H. Punter
Attorney, Agent, or Firm—Ernest D. Buff

[57] ABSTRACT

A method and apparatus for determining the temperature of gaseous materials are provided. Light produced by scattering in a gaseous material and having spectral components periodic in frequency is collected, collimated and transmitted by a light conditioning means to an interferometric means. The interferometric means selectively separates periodic spectra from the light and transmits the spectra in the form of a detectable signal containing first and second branches of the spectra. Means are provided for measuring the intensities of the branches and detecting and recovering the intensity ratio thereof, which is correlated with the temperature of the gaseous material.

18 Claims, 11 Drawing Figures

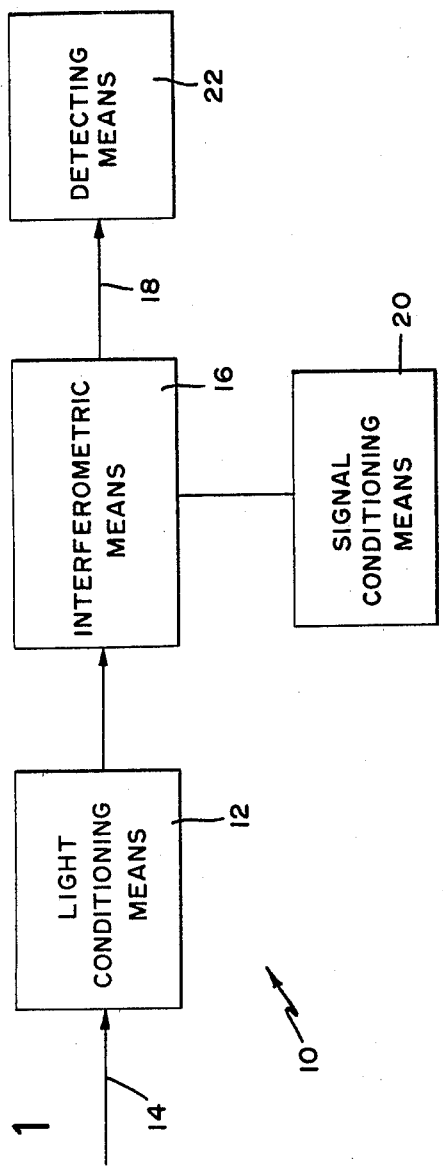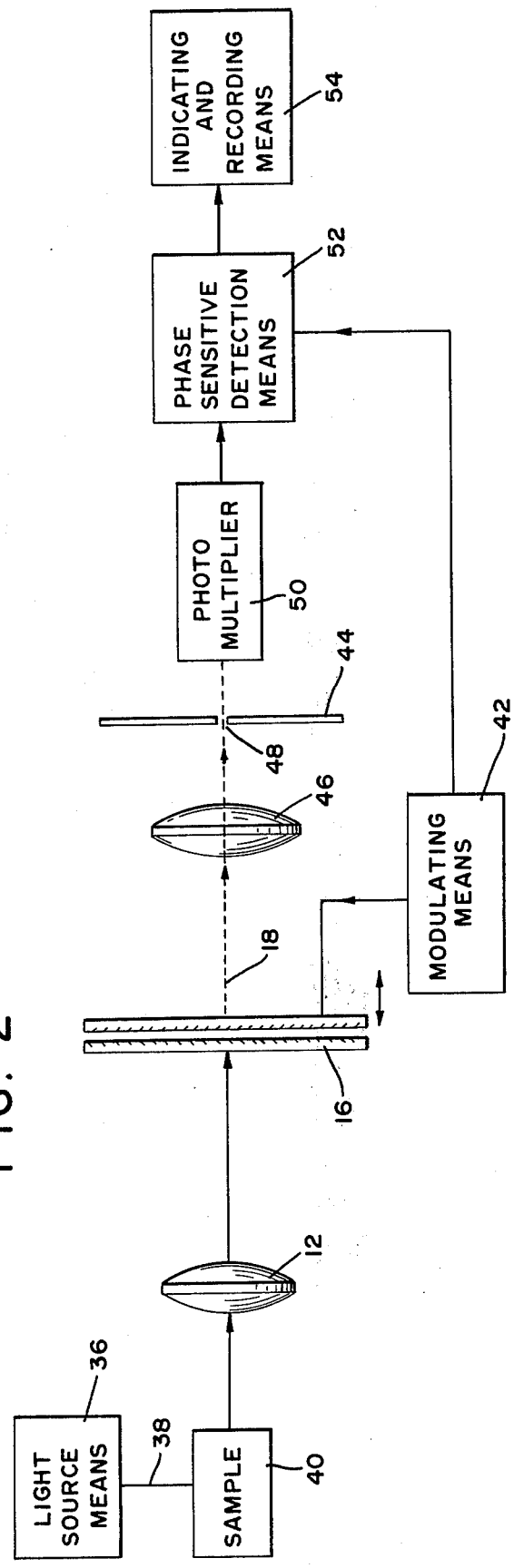
FIG. 1
FIG. 2

SPECTROSCOPIC TEMPERATURE MEASUREMENT

CROSS-REFERENCE TO RELATED APPLICATIONS

This application is a continuation-in-part of my co-pending application Serial No. 478,405, filed June 11, 1974, Pat. No. 3,909,132 entitled "Spectroscopic Temperature Measurement."

BACKGROUND OF THE INVENTION

This invention relates to a method and apparatus for measuring the temperature of gaseous materials through the selective transmission of their periodic spectra.

DESCRIPTION OF THE PRIOR ART

In the apparatus conventionally used for spectroscopic measurement of gas temperatures, light produced by scattering in the gas is collected and transmitted to a spectrometer whose pass band is scanned to transmit sequentially the rotational Raman spectra of the gas. The intensity of each spectral line is recorded as a function of frequency and used to calculate the temperature of the gas. It has also been proposed to spectroscopically measure gas temperature by transmitting such scattered light to a beam splitter associated with a pair of interference filters adapted to transmit single spectral lines or bands thereof from preselected portions of the rotational Raman spectrum of the gas. An intensity ratio derived from the output signals of the interference filters is used to calculate the temperature of the gas.

One of the major problems with such apparatus is the difficulty of accurately measuring the temperature of gases present at remote locations. The output signal from the spectrometer represents a relatively low intensity signal that is frequently obscured by spectral interference between rotational Raman spectra of the gas being measured and spectra of coexistent gases. Use of a beam splitter reduces the amount of light transmitted to and hence the intensity of the output signal from each interference filter associated therewith. Moreover, in order to minimize the aforesaid spectral interference, the interference filters are adjusted to transmit relatively low intensity signals derived from limited portions of the spectrum. For the above reasons, rotational Raman scattering is often too insensitive for measurement of temperatures of gases present at remote locations.

SUMMARY OF THE INVENTION

The present invention provides apparatus having increased sensitivity for spectroscopically measuring the temperature of gaseous materials. Such apparatus has light conditioning means for collecting, collimating and transmitting light produced by scattering in gaseous material and having spectral components periodic in frequency. An interferometric means adapted to receive such light selectively separates periodic spectra therefrom and transmits the spectra in the form of a detectable signal correlated with the temperature of the gaseous material. Such interferometric means has interference-producing means for providing a plurality of transmission windows regularly spaced in frequency. The frequency spacing between adjacent windows, or spectral range, of the interferometric means is adjusted to depart from an odd integral submultiple, $n$, of the frequency difference between adjacent spectral components of the periodic spectrum of a molecular species of the gaseous material, said odd integral submultiple being at least three, so as to produce a split-fringe containing first and second branches of the components. Such interferometric means also has scanning means for causing the transmission peaks for adjacent $n$th orders to substantially coincide with the spectral lines of either branch of the components. Each branch of the slit-fringe is derived from a plurality of periodic spectral lines and has an integrated intensity substantially equal to their sum. The intensity of each of the branches of the split-fringe is measured by a signal conditioning means, and the intensity ratio of the branches is indicated and recorded by detecting means, the intensity ratio correlating with the temperature of the gaseous material.

Further, the invention provides a method for determining the temperature of a gaseous material by analyzing light having spectral components periodic in frequency, comprising the steps of collecting, collimating and transmitting the light in the form of a ray path; interferometrically separating periodic spectra from the light by directing the light through a plurality of transmission windows regularly spaced in frequency, the frequency spacing between adjacent windows being adjusted to depart from an odd integral submultiple, $n$, of the frequency difference between adjacent spectral components of the periodic spectrum of the gaseous material, or a constituent thereof if the gaseous material comprises a mixture of gases, said odd integral submultiple being at least three, so as to produce a split-fringe containing first and second branches of the components, and scanning the ray path to cause the transmission peaks for adjacent $n$th orders to substantially coincide with the spectral lines of either branch of the components; transmitting a detectable signal composed of the split-fringe, each branch of the split-fringe being derived from a plurality of spectral lines and having an integrated intensity substantially equal to their sum; measuring the intensity of each of the branches; and detecting and indicating the intensity of each of the branches, the intensity ratio being correlated with the temperature of the gaseous material.

Although the light which is subjected to analysis can be received from an external source, it is usually produced by the apparatus. Thus, the apparatus preferably has light source means for generating monochromatic light. A projecting means associated with the light source means directs the monochromatic light through the gaseous material to produce scattered light having spectral components periodic in frequency. Light conditioning means are provided for collecting, collimating and transmitting the scattered light to an interferometric means of the type described.

Several known interferometric means may be adapted for use with the above apparatus. Preferably, the interferometric means is a Fabry-Perot interferometer (FPI) having a mirror separation, $d$, adjusted to transmit all rotational lines of a molecular species, or constituent, of the gaseous material in the form of a detectable signal correlated with the temperature thereof. This condition obtains when $$d = \frac{n}{8\mu(B \pm 60B^2/\omega_0)}$$

where $d$ is the mirror separation of the FPI, $n$ is an odd integer, $\mu$ is the index of refraction of the medium between the mirrors, and B is the molecular rotational constant of the species. For a given molecular species, the rotational constant B and mirror separations d for transmitting all the rotational Raman lines of the species are unique quantities. The intensity distribution of the transmitted spectra varies directly with the temperature of the species. Hence, the temperature of the species producing a particular rotational Raman spectrum is determined by adjusting the mirror sparation of the FPI to transmit all rotational Raman spectra of the species in the form of a split-fringe containing a frist branch (composed of Stokes rotational lines) and a second branch (composed of anti-Stokes rotational lines), measuring the peak intensity of each branch and determining the intensity ratio of the branches. Advantageously, the throughput of the FPI is considerably greater than that for a spectrometer or for a beam splitter associated with a pair of interference filters. Moreover, the detected signal has a pair of branches each of which is derived from a plurality of spectral lines and has an integrated intensity substantially equal to their sum. Spectral interference is minimized. The sensitivity of the apparatus is increased and highly sensitive forms and combinations of detectors, light sources, filters and control systems are unnecessary. As a result, the method and apparatus of this invention permits gas temperatures to be measured more accurately and at less expense than systems wherein the spectra are transmitted sequentially or from limited portions of the spectrum.

BRIEF DESCRIPTION OF THE DRAWINGS

The invention will be more fully understood and further advantages will become apparent when reference is made to the following detailed description of the preferred embodiments of the invention and the accompanying drawings in which:

FIG. 1 is a block diagram showing apparatus for determining the temperature of gaseous material by analyzing light having spectral components periodic in frequency;

FIG. 2 is a schematic diagram of the apparatus of FIG. 1 including, additionally, means for producing light carrying such spectra;

DESCRIPTION OF THE PREFERRED EMBODIMENTS

Figure 3:
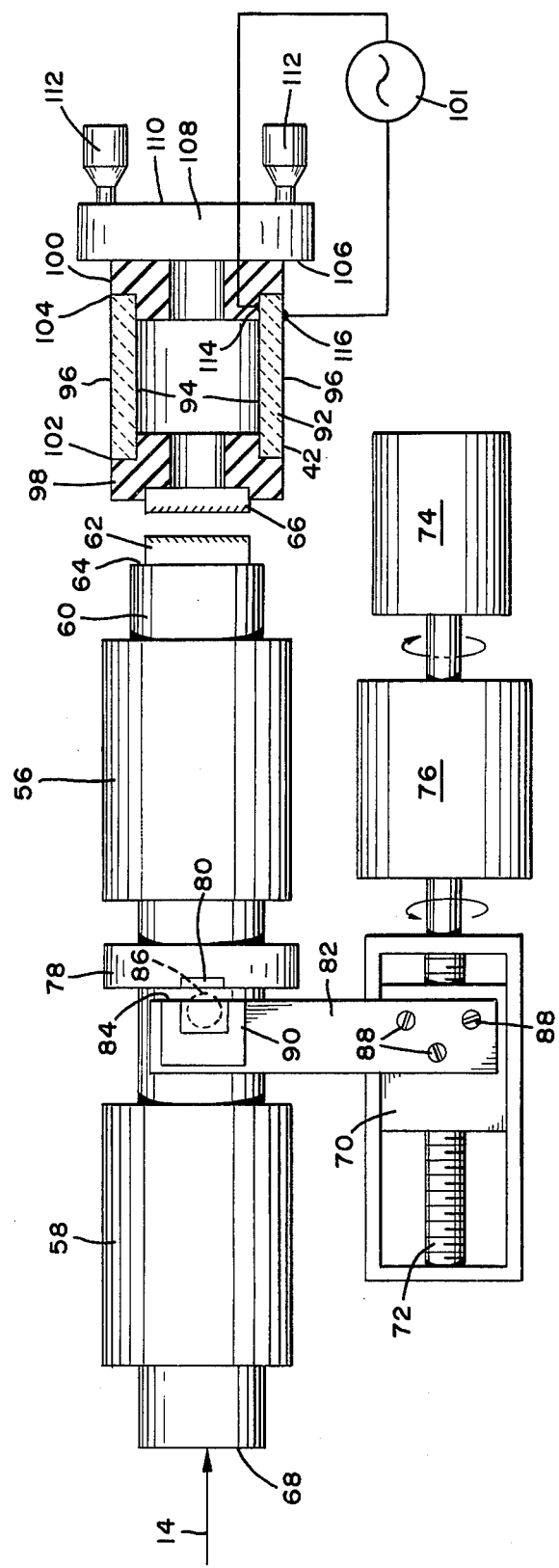
FIG. 3 is a side view, partially cut away, showing means for modulating the interferometric means of FIGS. 1 and 2.

Light scattered from gaseous material and having spectral components periodic in frequency can be produced in each of the visible, infrared and ultraviolet frequency regions at intensities sufficient to measure the temperature of the gaseous material. As a consequence, the invention will function with light having a relatively wide range of frequencies. For illustrative purposes, the invention is described in connection with apparatus for measuring temperature of gaseous material by analyzing scattered light from the visible frequency region. When applied in this manner, the invention is particularly suited to measure the temperature of a gas mixture such as air. It will be readily appreciated that the invention can be practiced using light from any of the foregoing frequency regions, and that it can be employed for similar and yet diversified uses, such as remote detection of clear air turbulence, weather forecasting, gas stream analysis, industrial process control systems and the like.

Referring to FIG. 1 of the drawings, there is shown preferred apparatus for measuring the temperature of gaseous material. The apparatus, shown generally at 10, has light conditioning means 12 for collecting, collimating and transmitting light 14 having spectral components periodic in frequency. An interferometric means 16 receives the light 14, selectively separates preselected spectra therefrom and transmits the spectra in the form of a spirit-fringe containing first and second branches of the spectra which provides a detectable signal 18. Generally, such preselected spectra are those produced by scattering of a major constituent of the gaseous material as, or example, the rotational Raman spectra of oxygen or nitrogen in a sample of air. A signal conditioning means 20 associated with the interferometric means 16 measures the intensity of each branch. The intensity ratio of the branches is measured by a detecting means 22, and used to calculate the temperature of the gaseous material.

More specifically, as shown in FIG. 2, the interferometric means 16 has interference-producing means for providing a plurality of transmission windows regularly spaced in frequency. In addition, the interferometric means 16 has scanning means for variably controlling the frequency of each order. The frequency spacing between adjacent windows of the interferometric means 16 is adjusted to depart from an odd integral submultiple, n, of the frequency difference between adjacent spectral components of the periodic spectrum of a molecular species of the gaseous material, said odd integral submultiple being at least three, so as to produce the split-fringe. The scanning means is then adjusted so that the transmission peaks for adjacent nth orders substantially coincide with the spectral lines of either branch of the components. When the interferometric means 16 is adjusted in the above manner, each branch of the split-fringe is derived from a plurality of periodic spectral lines and has an integrated intensity substantially equal to their sum.

As previously noted, the light 14 which is subjected to analysis can be received from an external source. Generally, however, the light 14 is produced by the apparatus 10. Hence, the apparatus 10 has light source means 36, such as a conventional argon ion laser, a frequency doubled, pulsed ruby laser or the like, for generating a highly monochromatic, coherent, collimated beam of radiation. The resolving power of the interferometric means 16 is best utilized when the light source means 36 is provided with means for projecting light having a line width and frequency stability about equal to or less than the instrumental width, described hereinafter in greater detail, of the interferometric means 16.

The use of a pulsed laser as the light source means 36 together with a time gated electronic detection system permits determination of temperature and location of a sample of gaseous material remote from the aparatus 10. For example, by providing the apparatus 10 with (1) means for measuring the time interval required to send a laser pulse into the sample and receive a return signal caused by light scattered therein and (2) means for measuring the amplitude of the return signal, the distance of the sample from the apparatus 10 as well as the temperature thereof is readily obtained. A pulsed laser adapted to determine temperature and location in the above manner preferably has means for projecting light having a line width and frequency stability about equal to or less than the instrumental width of the interferometric means associated therewith. Such means typically includes a mode selecting etalon disposed in the laser cavity.

A projecting means associated with the light source means 36, introduces the radiation, schematically represented by ray path 38, into gaseous material in sample compartment 40 in one direction, which will be considered to be substantially vertical for convenience in referencing direction, but may, of course, be in any direction desired. Raman scattered radiation, hereinafter referred to as light 14, from the gaseous material in sample compartment 40 is collected, collimated and transmitted to the interferometric means 16 by the light conditioning means 12, which may be a lens, or other suitable optical system. As long as the gaseous material contains molecules which are of the linear or symmetric top variety, the light 14 will exhibit spectral components periodic in frequency.

The signal conditioning means 20 has modulating means 42 for modulating the phase difference between interfering rays of light 14 transmitted by the interferometric means 16 so as to compare the peak intensities of the branches of the split-fringe transmitted thereby. Signal conditioning means 20 also has synchronous (e.g., phase sensitive) detecting means for detecting the intensity ratio of the latter split-fringe, whereby the intensity ratio of the split-fringe can be indicated by the detecting means 22.

Several known interferometric means may be adapted to selectively separate periodic spectra from the light 14. Preferably, the interferometric means is a Fabry-Perot Interferometer (FPI) having a mirror separation, d, adjusted to transmit all rotational lines of a molecular species of the gaseous material. The transmission function of an FPI ($I_t$) can be given by the Airy formula: $I_t = \tau^2[1+R^2-2R\cos\phi]^{-1} I_0$ where $\tau + R + A = 1$, $I_0$ is the intensity of the incident light, and the phase difference $\phi$ is expressed as $\frac{1}{2}\phi = 4\pi\mu\omega d$ for rays normal to the FPI mirrors. The symbols, A, R and $\tau$ represent, respectively, the absorbance, reflectance and transmittance of the FPI mirrors, $\mu$ is the refractive index of the medium between the FPI mirrors, d is the FPI mirror separation, and $\omega$ is the frequency of the incident light expressed in wavenumbers. When $\cos \frac{1}{2}\phi$ is equal to unity, transmission maxima for $I_t$ occur. Hence, $\frac{1}{2}\phi = 2\pi m$, where m takes on integral values and represents the order of interference. The transmission maxima for $I_t$ are referred to in the specification and claims as transmission windows. For a specific value of the mirrow separation d, the FPi provides a plurality of transmission windows regularly spaced in frequency. The frequency spacing, $\Delta f$, between adjacent windows (or spectral range) of the FPI is $\Delta f = (2\mu d)^{-1}$. By varying the mirror spacing, $d$, of the FPI, $\Delta F$ can be adjusted to depart from the frequency difference between adjacent spectral components of a specific periodic spectrum by a preselected frequency difference as in the order of about $$\frac{160B^2}{\omega_0 n} \text{ to } \frac{480B^2}{\omega_0 n}$$

and preferably about $$\frac{240B^2}{\omega_0 n} \text{ to } \frac{320B^2}{\omega_0 n}.$$

If the rotational Raman spectrum of a gas is used as the periodic spectrum, the FPI will behave as a comb filter having its transmission windows matched to the given periodic spectrum so as to transmit all of the Raman lines of the spectrum in the form of a split-fringe containing first and second branches of the lines and block the Rayleigh line when the mirror spacing is adjusted so that $$\Delta f = \frac{4B}{n} \pm \frac{240B^2}{\omega_0 n}$$

where B is the rotational constant of a molecular species, or constituent of the gas. The Rayleigh line is blocked because it falls between two FPI transmission windows. Moreover, in the Raman spectrum, the Stokes and anti-Stokes Raman lines are symmetrically positioned around the Rayleigh line (at$\omega = \omega_0$). The first two Raman lines (having rotational quantum number, J, equal to zero) are shifted away from $\omega_0$ by a frequency of 6B, whereas the frequency separation of successive rotational lines is 4B. Continuous scanning of the FPI in the vicinity of $$d = \frac{n}{8\mu(B \pm 6 0B^2/\omega_0)}$$

produces an interferogram having equally spaced vertical lines of constant amplitude, which represent Rayleigh fringes at $\omega_o$, and a plurality of split-fringes, positioned between such vertical lines, each of the split-fringes containing a first branch (composed of the Stokes rotational lines) and a second branch (composed of the anti-Stokes rotational lines). When $\Delta f = 4B/n$, the transmission peaks for adjacent orders coincide with the adjacent rotational Raman lines so as to produce a 1:1 correspondence therewith, and the amplitude of the Raman fringe transmitted is a maximum. For values of $\Delta f$ slightly different from $4B/n$, the transmission peaks for adjacent orders will not perfectly coincide with the Raman spectrum and the profile of the Raman fringe transmitted by the FPI will split into such first and second branches.

Figure 4:
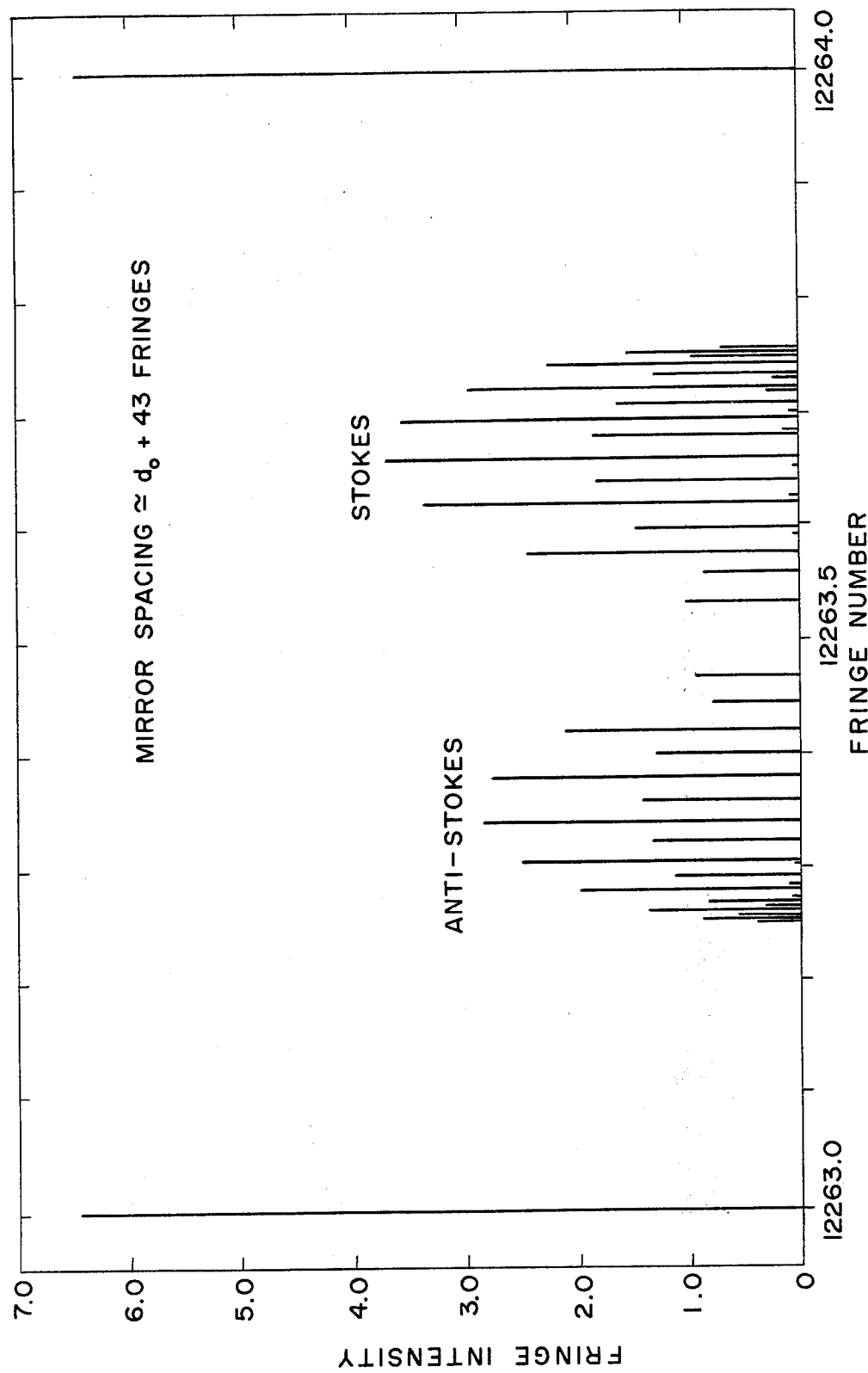
FIG. 4 is a graph showing schematically the peak intensities of preselected spectral components and their relative positions within a given fringe.

In order to illustrate the manner in which the Raman fringe splits to form a Stokes branch and an anti-Stokes branch, the positions and peak intensities of the individual rotational Raman lines were plotted for a mirror separation slightly larger than the mirror separation corresponding to the center of the 4B/5 interference pattern for nitrogen. The result is shown in FIG. 4. This figure shows schematically the relative positions of the individual rotational Raman lines between two 514.5 nm Raleigh fringes corresponding to the fringe numbers 12263 and 12264. The peak rotational line intensities were calculated for a gas temperature of 300K and the nitrogen ground state rotational constants of $B_o = 1.989506$ cm$^{-1}$ and $D_o = 5.48 \times 10^{-6}$ cm$^{-1}$. For the Stokes branch lines, the Raman frequency of the rotational line with quantum number J is $$\omega_s = \omega_o - (4B_o - 6D_o)(J + 3/2) + 8D_o(J + 3/2)^3$$

and the corresponding peak line intensity is $$H(\omega_s) = K(B_o/T)\left[\frac{3(J+1)(J+2)}{2(2J+3)}\right]\left(\frac{\omega_s}{\omega_o}\right)^4 \exp[-B_oJ(J+1)hc/kT]$$

where K is a proportionality constant, T is the absolute temperature and $h$, $c$, and $k$ are Planck's constant, the speed of light and Boltzmann's constant, respectively. For the anti-Stokes branch, the corresponding Raman frequency and peak intensity are given by $$\omega_A = \omega_o + (4B_o - 6D_o)(J + 3/2) - 8D_o(J + 3/2)^3$$

and $$H(\omega_A) = K(B_o/T)\left[\frac{3(J+1)(J+2)}{2(2J+3)}\right]\left(\frac{\omega_A}{\omega_o}\right)^4 \exp[-B_o(J+2)(J+3)hc/kT]$$

The rotational lines shown in FIG. 4 are depicted as having zero linewidth. In reality, each line has a finite width which is due to the combined effects of the laser linewidth, Doppler broadening by the scattering process and instrumental broadening by the Fabry-Perot interferometer. In order to determine the fringe profile, a computer program was written and tested which takes into account the aforementioned factors. For the purpose of calculation, it is assumed that the laser line is gaussian shaped with a width of $\Delta\omega_o$. This laser line was convolved with the Doppler broadened profiles for the Rayleigh line and the individual Raman lines. A convolution was then performed with the instrumental transfer function of the interferometer. At specified fringe intervals, the contributions from the Rayleigh line and all the individual Raman lines were summed to yield the fringe profile at that particular mirror position.

The Fabry-Perot transfer function may be written as $$I(\omega) = G_A(\omega) * G_D(\omega) * G_S(\omega)$$

where
$G_A(\omega)$ = the Airy function $G_D(\omega)$ = the mirror defect function, and $G_S(\omega)$ = the scanning aperture function.

It can be shown mathematically that the Fourier transform of the convolution of two or more functions is equal to the product of the Fourier transforms of the individual functions. Therefore, the Fourier transform of $I(\omega)$ is $$i(X) \equiv F.T.[I(\omega)] = g_A(X) \cdot g_D(X) \cdot g_S(X)$$

where $g_A$, $g_D$ and $g_S$ are the Fourier transform of $G_A$, $G_D$ and $G_S$, respectively.

The Airy function, $G_A(\omega)$, can be written as $$G_A(\omega) = \frac{\tau^2}{(1 - 2R\cos 2\pi\omega\gamma + R^2)}$$

$$= \frac{\tau^2}{(1-R^2)}\left[1 + 2\sum_{N=1}^{\infty} R^N \cos 2\pi N\omega\gamma\right]$$

where $\gamma = 2\mu d$ = the optical path between interfering rays. The Fourier transform of $G_A(\omega)$ is $$g_A(X) = \frac{\tau^2}{(1-R^2)}\left[\sum_{N=0}^{\infty} \delta R^N(X - N\gamma)\right]$$

This transform is non-zero only for the discrete values of $X = N\Xi$. The mirror defect function, $G_D(\omega)$ can be expressed as $G_D(\omega) = 1$ for $-[2\gamma F_D]^{-1} \leq \omega < [2\gamma F_D]^{-1}$, = 0 for all other $\omega$ where $F_D$ = Defect finesse = ½ m for $\lambda/m$ flatness figure. The Fourier transform of $G_D(\omega)$ is $$g_D(X) = \frac{\sin[\pi(\gamma F_D)^{-1} X]}{[\pi(\gamma F_D)^{-1} X]}$$

Similarly, the scanning aperture function can be written as $G_S(\omega) = 1$ for $-[2\gamma F_S]^{-1} \leq \omega < [2\gamma F_S]^{-1} = 0$ for all other $\omega$.

The scanning finesse, $F_S$, is defined as a $$F_S = \frac{2}{(\gamma \omega_o \theta_p^2)}$$

where $\theta_p$ is the pinhole angle in radius. The Fourier transform of $G_S(\omega)$ is $$g_S(X) = \frac{\sin[\pi(\gamma F_S)^{-1} X]}{[\pi(\gamma F_S)^{-1} X]}$$

A broadened line profile, H ($\omega$), is of the form $$H(\omega) = H(\omega_R) \exp[-(4 \ln 2)(\omega - \omega_R)^2/(\Delta \omega_R)^2]$$

where $\omega_R$ = Raman frequency (cm$^{-1}$)
$H(\omega_R)$ = peak intensity of the individual Raman lines and
$\Delta \omega_R$ = the Doppler line width.

$$\Delta \omega_R = \frac{2}{c}(2R \ln 2)^{1/2} \left[\frac{T}{M}\right]^{1/2} \left[4(\omega_o^2 + \omega_o \omega_R) \sin^2 \frac{\phi}{2} + \omega_R^2\right]^{1/2}$$

where
T = the absolute temperature (K)

M = the molecular weight

R = the gas constant, and $\phi$ = the scattering angle.

The Fourier transform of H ($\omega$) is $$h(X) = F.T.[H(\omega)]$$

$$= H(\omega_R) \exp\left[-\frac{\pi^2(\Delta \omega_R)^2}{4 \ln 2} \cdot X^2\right].$$

A pressure broadened line profile, L($\omega$), may be represented by an Lorentzian function given by the equation:

$$L(\omega) = (\Delta \omega_p/2) [(\omega - \omega_R)^2 + (\Delta \omega_p/2)^2]^{-1}$$

where $\omega_R$ = the Raman frequency (cm$^{-1}$)
$\Delta \omega_R$ = the full width at half maximum of the pressure broadened line.

The Fourier transform of L($\omega$) is $l(X) = $ F.T. $[L(\omega)] = $ exp $[-\pi \Delta_p X]$. The convolution of all these functions is achieved by forming the product of the Fourier transforms and then taking the inverse Fourier transform of the product. The calculation is simplified by the presence of the $\delta$-function in the Fourier transform of the Airy function, since it is necessary to compute the product only for discrete values of $X = N\gamma$ where $N = 1, 2, 3,$ etc.

The computer program begins by calculating the frequencies and peak intensities of the individual Raman lines. For a given optical path difference, $\gamma$, an array A(N) is calculated. The array A(N) is the product of the Fourier transforms of the FPI transfer function, a gaussian lineshape for the exciting laser light, a gaussian lineshape for the Doppler broadened scattered light and a Lorentzian lineshape for the pressure broadened scattered light. The intensity of the interferogram for a given $\gamma$ is $$I(\gamma) = \sum_i H_i \frac{\tau^2}{(1-R^2)} \left[1 + 2 \sum_{N=1}^{\infty} A(N) \cos 2\pi N \omega_i \gamma\right]$$

where the index $i$ runs over all spectral lines. The value of $\gamma$ is incremented and the calculation is repeated.

Figure 5:
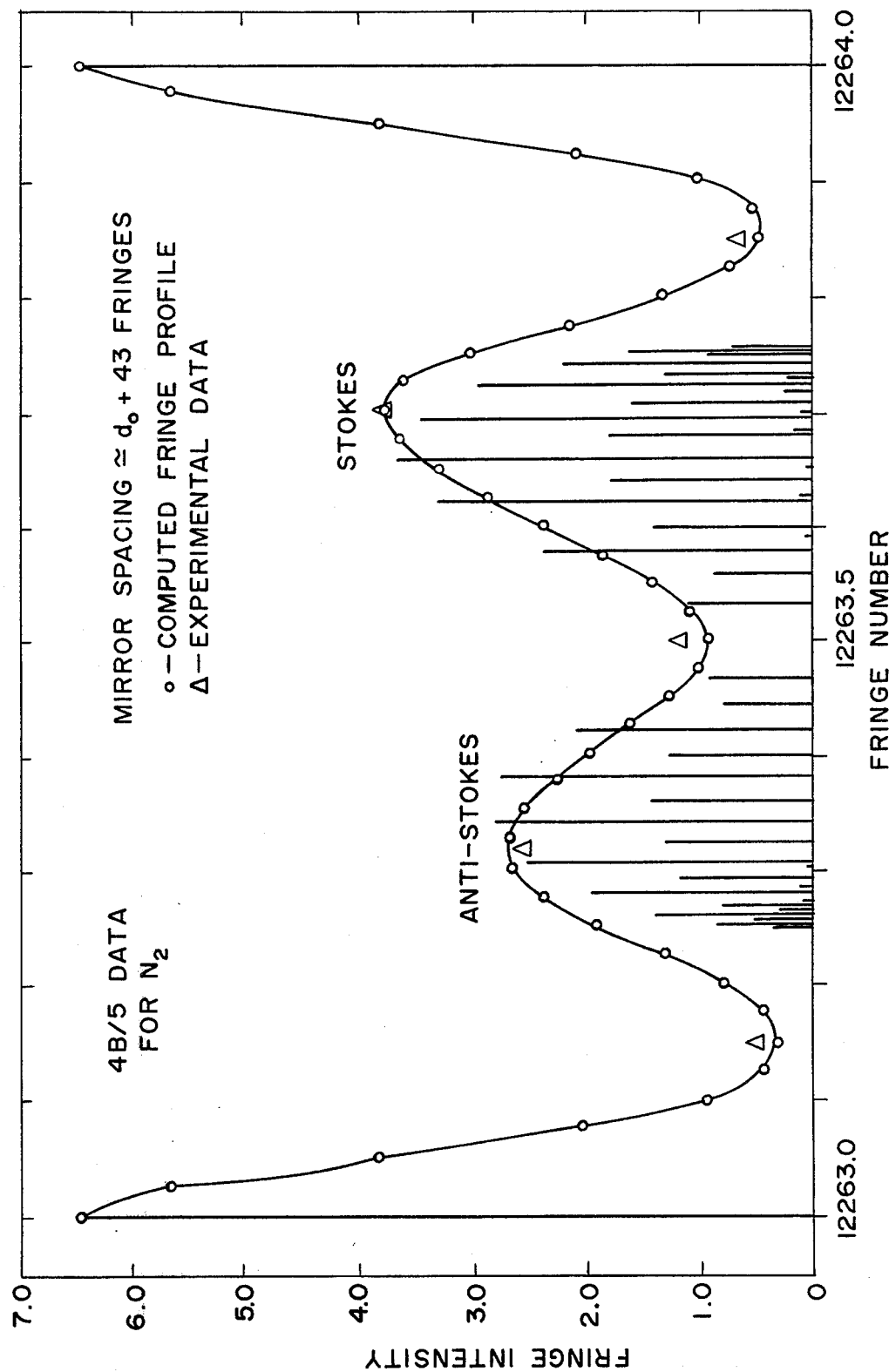
FIG. 5 is a graph showing schematically a split-fringe profile for the spectral components of FIG. 4.

This computer program was used to calculate the fringe profile for the fringe interval shown in FIG. 4. The results of the calculation are shown in FIG. 5. The open circles represent the calculated are shown in FIG. 5. The open circles represent the calculated profile for this particular fringe interval and the five triangular points which represent experimental data indicate that the agreement between the experimental and calculated fringe profiles is quite good.

Figure 6:
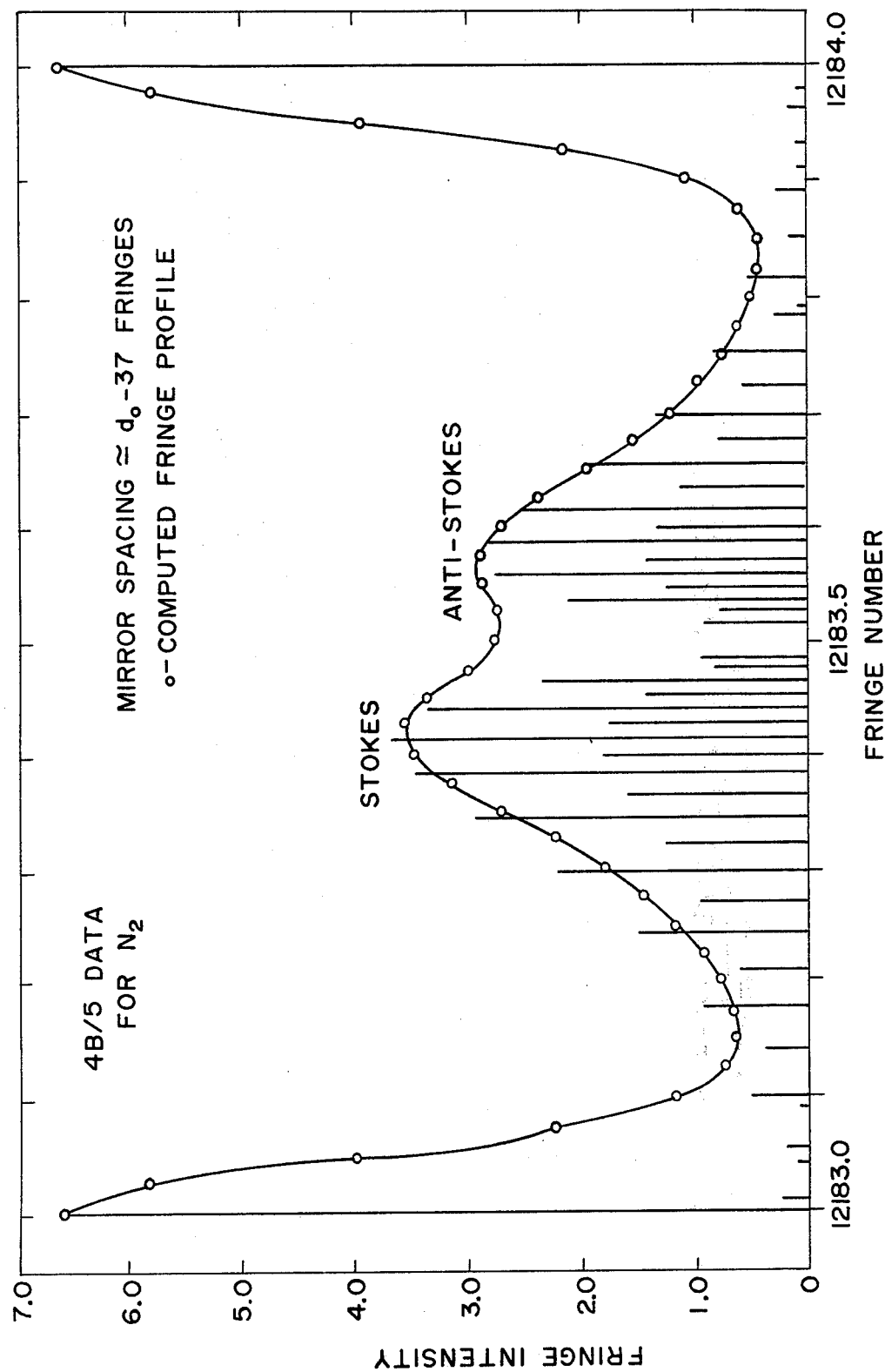
FIG. 6 is a graph showing a computed split-fringe profile for nitrogen gas.
Figure 7:
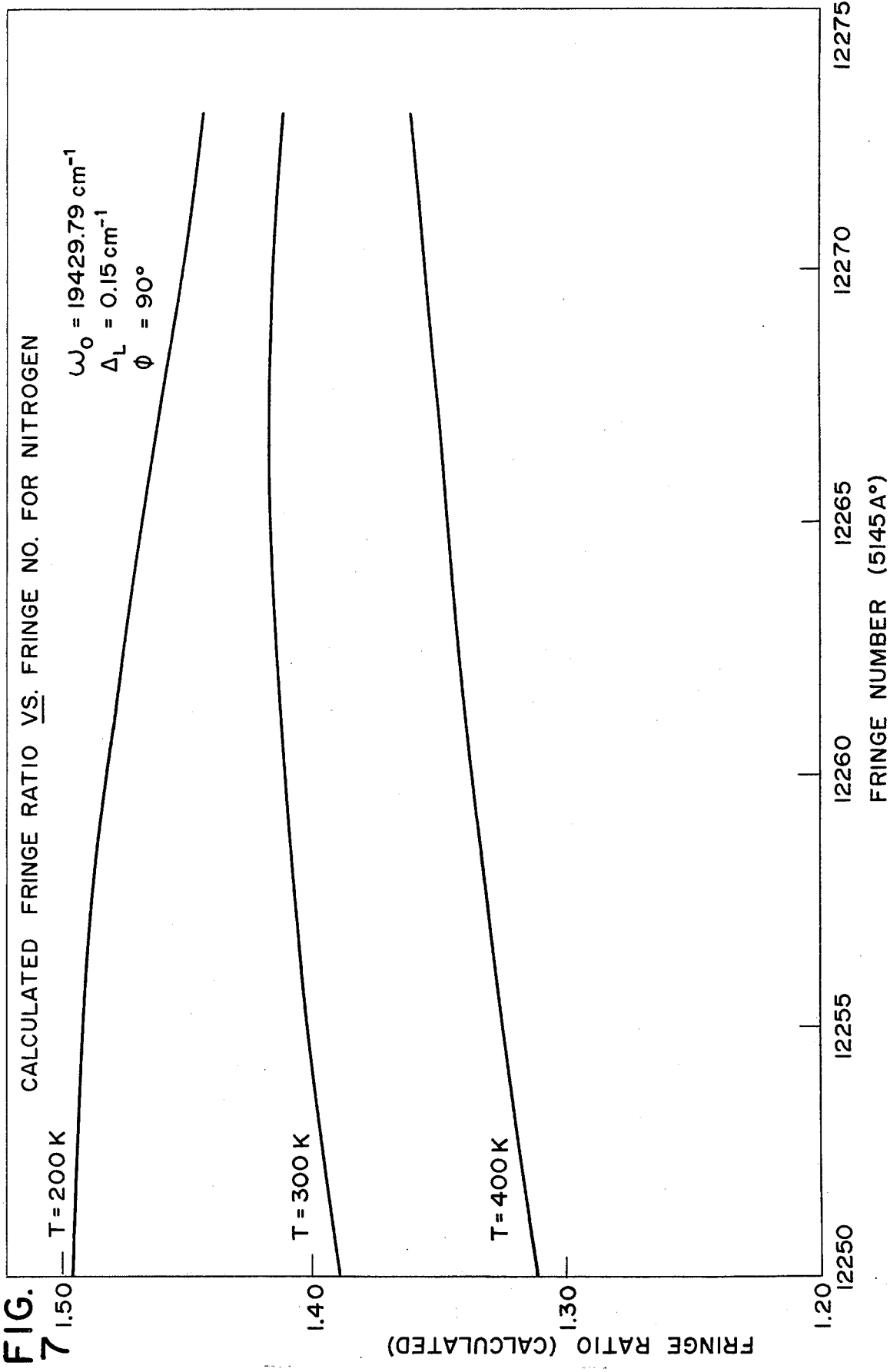
FIG. 7 is a graph showing calculated intensity ratios for different fringe numbers of the split-fringe for nitrogen gas at temperatures of 200° K, 300° K and 400° K.
Figure 8:
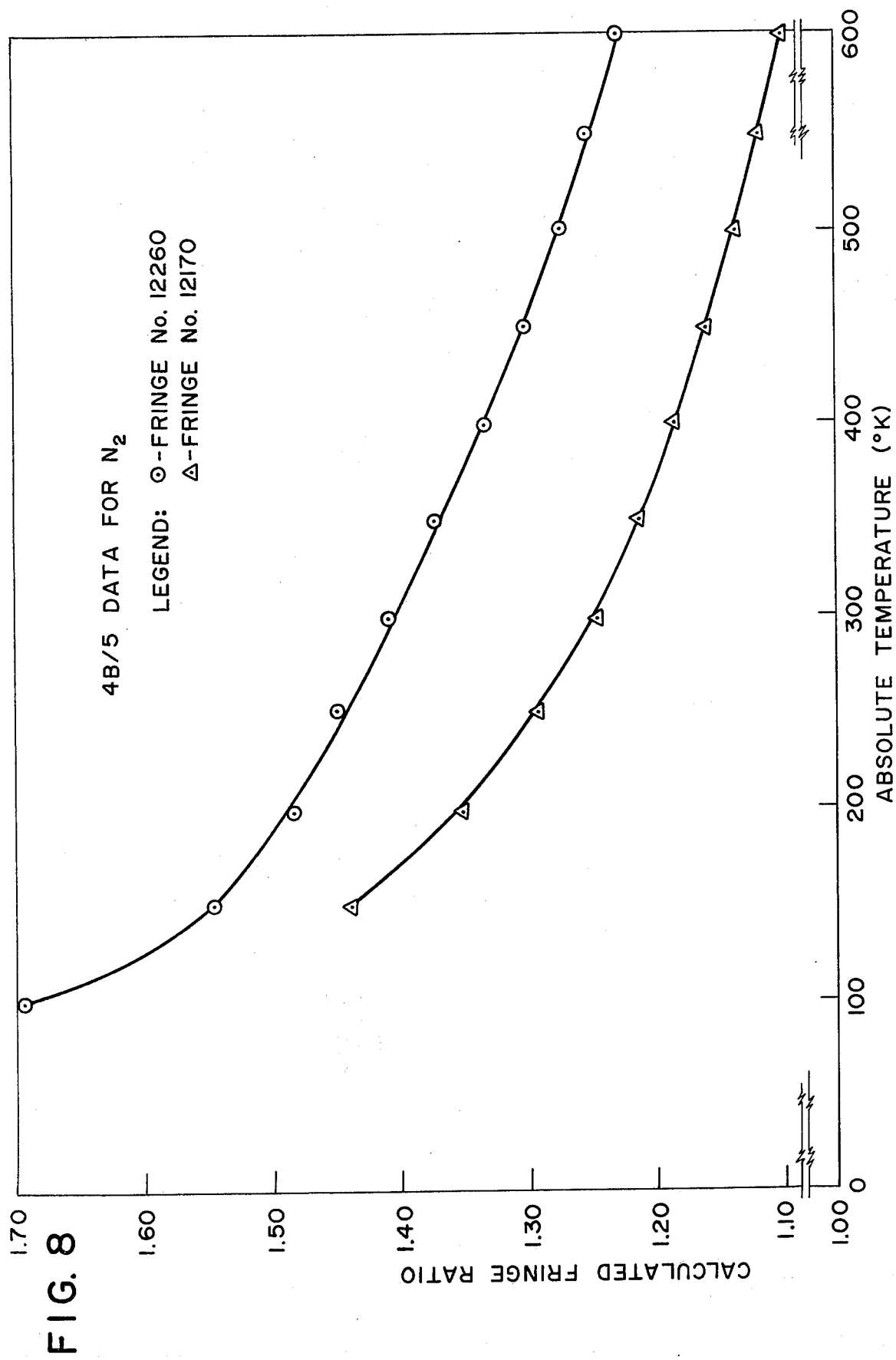
FIG. 8 is a graph showing calculated intensity ratios of split-fringes for nitrogen gas within the range of 100° K–600° K and values of the free spectral range in the vicinity of 4B/5.

A computed fringe profile for a fringe interval corresponding to a mirror separation slightly less than the mirror separation for the center of the 4B/5 interference pattern in nitrogen is shown in FIG. 6. Since the positions of the individual Raman lines within a given fringe changes as the mirror separation is changed, this ratio of the Stokes branch intensity to the anti-Stokes branch intensity shown in FIG. 6 differs from that shown in FIG. 5. In order to investigate the variation of this Raman intensity ratio as a function of fringe number (mirror separation), fringe profiles were calculated for three different temperatures for the fringe numbers 12250 to 12273 inclusive. The Raman intensity ratios were calculated from the computer fringe profiles and the results are plotted in FIG. 7 for nitrogen gas. The change in the Raman intensity ratio as a function of temperature was determined by arbitrarily selecting a fringe interval (12260 to 12261) and calculating the Raman fringe profiles for several different temperatures. FIG. 8 is a graphic representation showing the variation of the calculated split fringe ratio over the temperature range 100K to 600K. Also shown in FIG. 8 is the variation of the calculated split fringe ratio for the fringe 12170 within the same temperature range.

Figure 9:
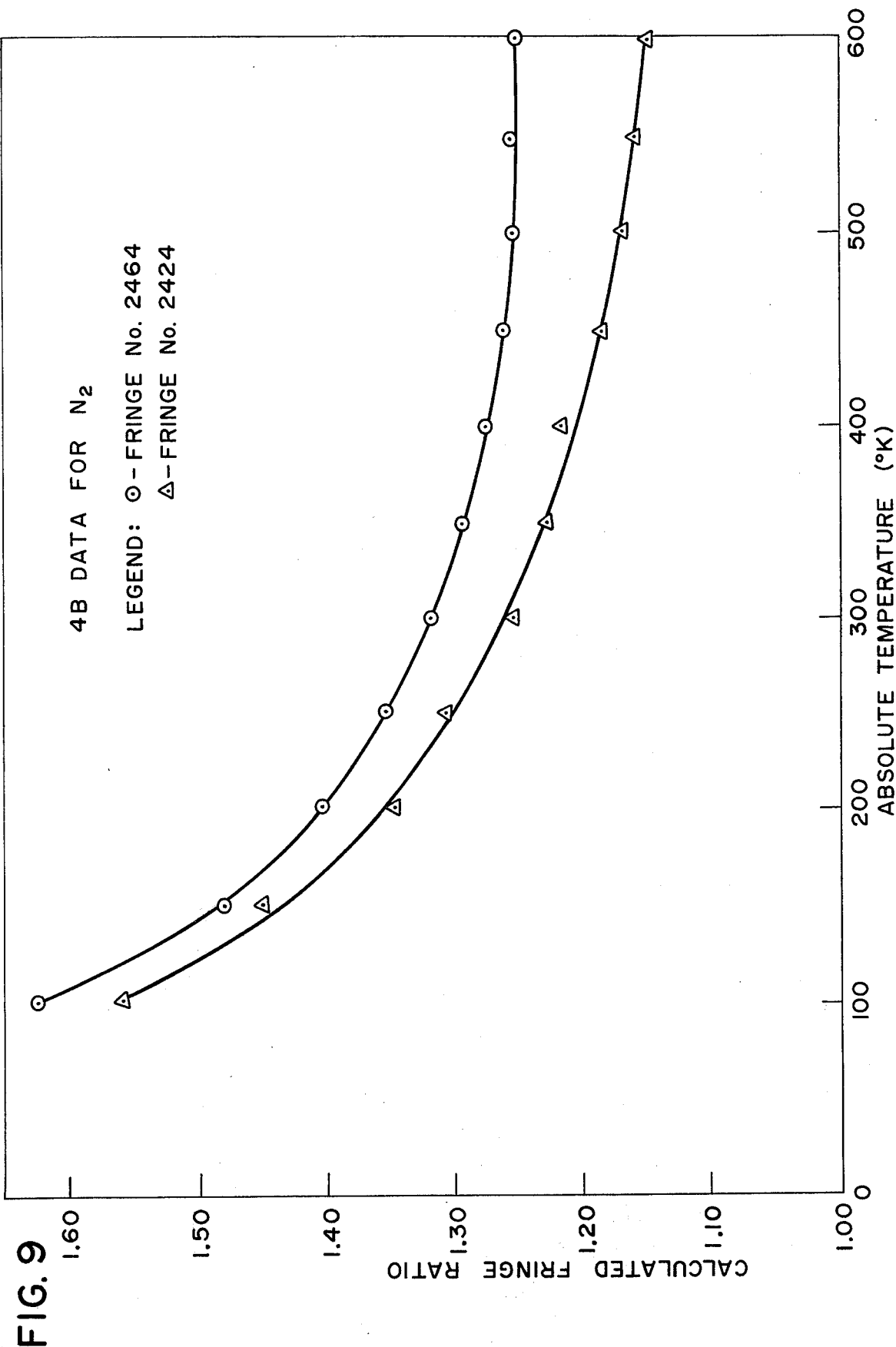
FIG. 9 is a graph showing calculated intensity ratios of the split-fringes for nitrogen gas within the temperature range of 100° K–600° K and at values of the free spectral range in the vicinity of 4B.

A similar computer investigation was carried out for the 4B interference pattern of nitrogen for selected fringe intervals on either side of the 4B interference maxima (which occurs at the 514.5 nm order number of 2443). These results are shown in FIG. 9. In practice, the Raman fringe intensity ratio is measured from a fringe number produced by an experimentally determined mirror separation. For that particular fringe, a computer calculation is then performed to give the Raman fringe intensity ratio as a function of temperature according to the aforementioned equation on page 13, line 19. Alternatively, the Raman fringe intensity ratio is experimentally measured for several known gas temperatures in the range of interest in order to calibrate the apparatus 10. FIGS. 8 and 9 show that the Raman intensity ratio for the split fringe varies inversely with gas temperature, i.e., the ratio is greater at lower temperatures than at higher temperatures.

The temperature of a preselected constituent of gaseous material can also be determined by measuring the frequency difference between preselected portions (preferably the peak portions) of first and second branches of the split fringe. Such a frequency difference is produced when the spectral range of the interferometric means is adjusted to depart from an odd integral submultiple, n, of the frequency difference between adjacent spectral components of the periodic spectrum of a molecular species of the gaseous material appointed for analysis, and the scanning means is adjusted to cause transmission peaks for adjacent nth orders to substantially coincide with the spectral lines of either branch of the components. The frequency difference between the preselected portions of the first and second branches is measured by the signal conditioning means, indicated and recorded by detecting means and correlated with the temperature of the gaseous material.

Figure 10:
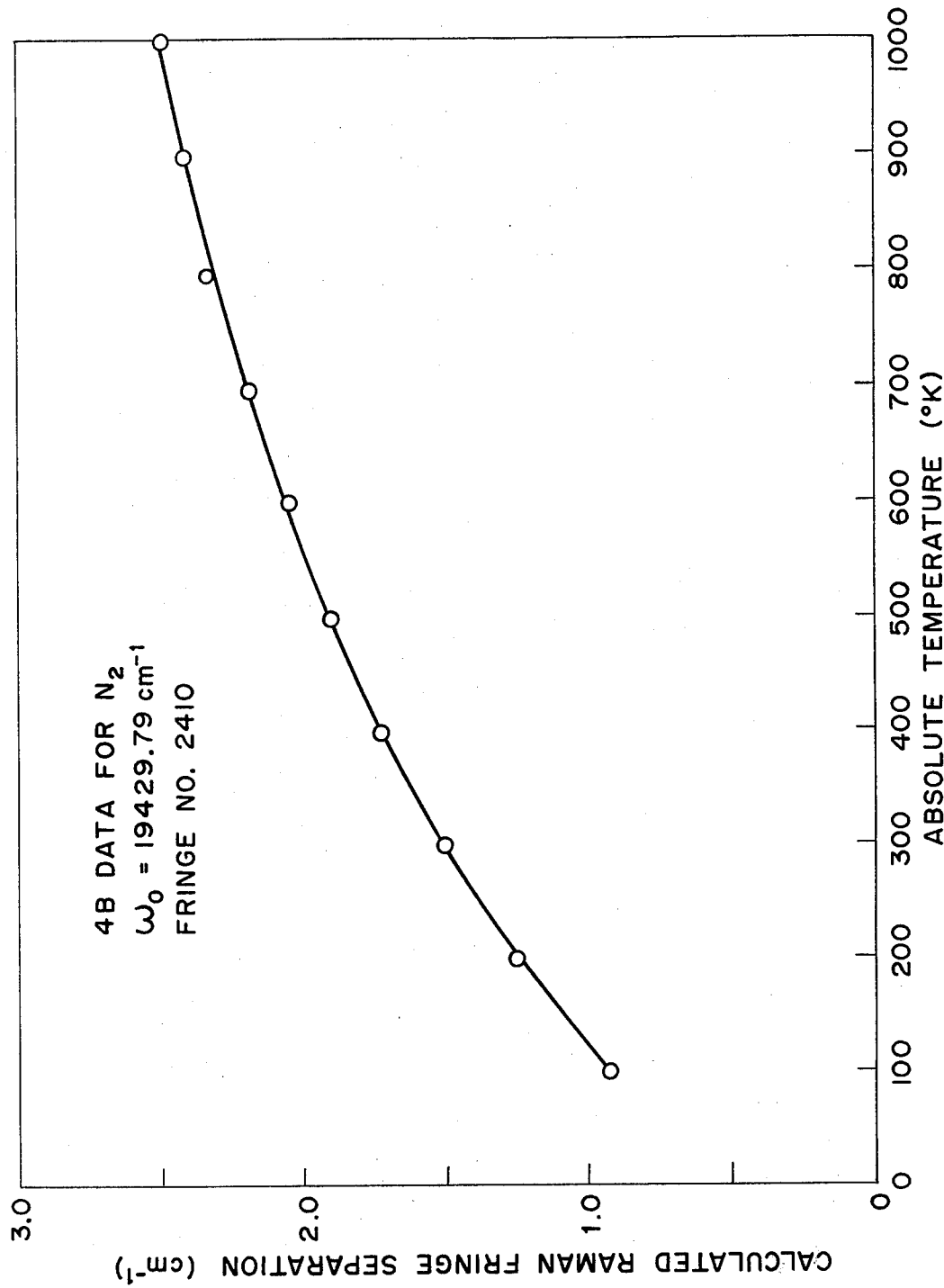
FIG. 10 is a graph showing computed variations of the frequency difference between peak portions of a split-fringe for nitrogen gas within the temperature range of 100-1000° K and at values of the free spectral range in the vicinity of 4B.
Figure 11:
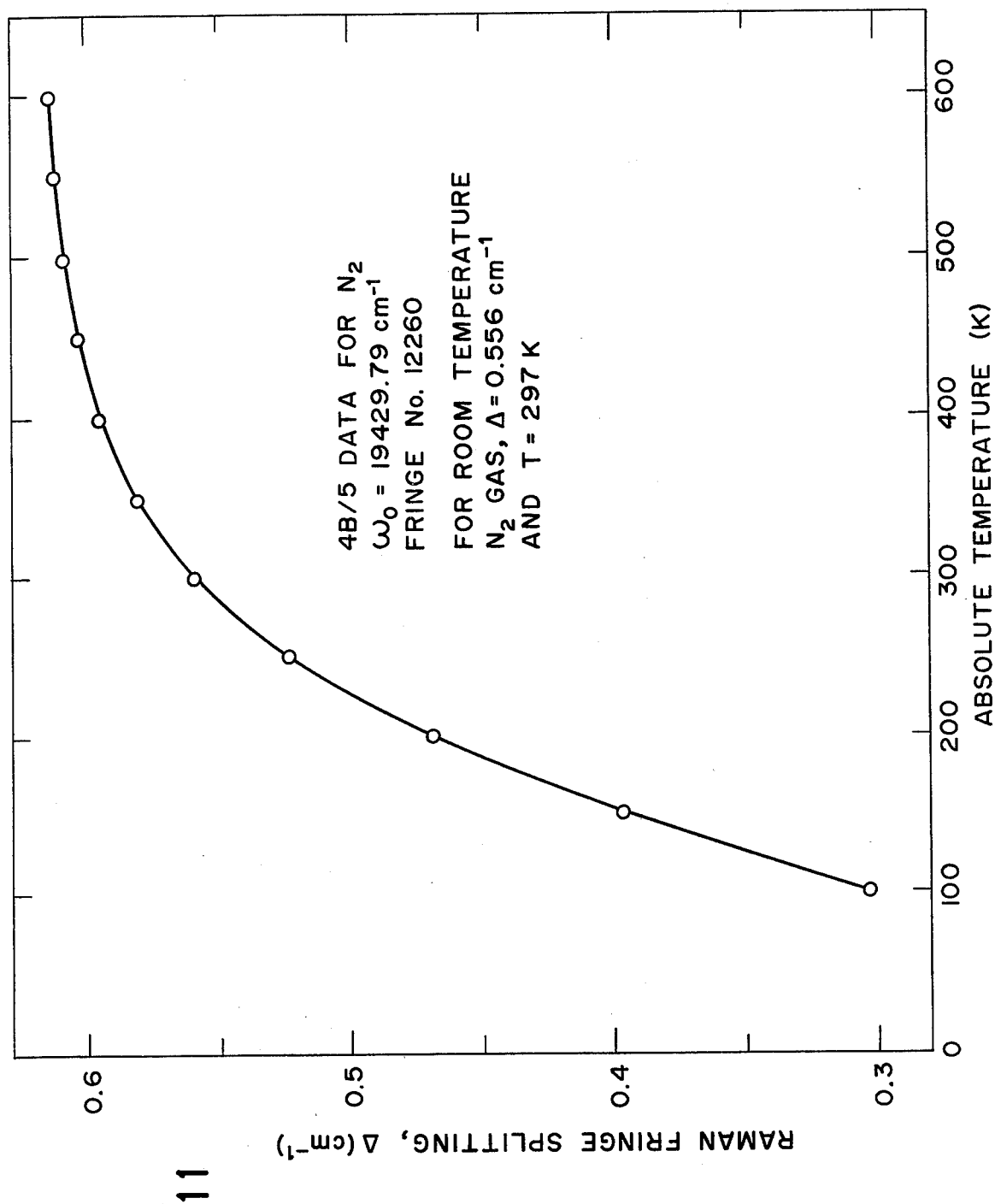
FIG. 11 is a graph showing computed variations of the frequency difference between peak portions of a split-fringe for nitrogen gas within the temperature range of 100–600° K and at values of the free spectral range in the vicinity of 4B/5.

The variation in frequency difference as a function of temperature was determined by means of the fringe profile computor program for nitrogen gas. FIG. 10 is a graphic representation showing the computed variation of the frequency difference between the peak portions of the split-fringe over a temperature range of 100°–1000° K for the 514.53 nm order number of 2410. FIG. 11 is a graphic representation showing the computed variation of the frequency difference betwen the peak portions of the split-fringe over a temperature range of 100°–600° K for the 514.53 nm order number 12,260. For nitrogen gas at room temperature the frequency difference between the peak portions of the split-fringe was determined experimentally to be 0.556 $cm^{-1}$. From the computed data shown in FIG. 11, the temperature corresponding to the frequency difference of 0.556 $cm^{-1}$ is equal to b 297 K, or 24° C., which equaled, approximately, the ambient temperature.

For certain molecules, such as oxygen and carbon dioxide, spectral components of the rotational Raman spectra having either even or odd rotational quantum numbers (J) will have zero intensity. This alternation in the intensity of the rotational Raman lines is produced by the effects of nuclear spin. For such molecules, adjacent rotational lines in the Stokes and anti-Stokes branches are separated by a frequency substantially equal to 8B. Secondary interferograms are produced for values of the interferometer spectral range equal substantially to 8B/n, where n is an odd integer. The secondary interferograms which are produced, consist of two Raman fringes between adjacent Rayleigh fringes: one Raman fringe being due to the simultaneous transmission by the FPI of only Stokes Raman lines and the other Raman fringe being due to the simultaneous transmission by the FPI of only anti-Stokes Raman fringes. By measuring the intensity ratio of the peaks of these two fringes, gas temperatures may be deduced. This technique will be useful for only molecules with either odd or even J value lines missing.

As previously noted, a modulating means 42 is associated with the interferometric means 16 for modulating the phase difference, $\phi$, so as to compare the peak intensities of the branches of the split-fringe transmitted thereby. In order to obtain the maximum modulated signal from the split-fringe appointed for analysis, the modulating means is adjusted to modulate between the peak portion of each branch thereof. Generally speaking, the modulating range should be no greater than the frequency spacing between adjacent orders.

The resultant signal 18 from the interferometric means 16 is collected and focused in the plane of pinhole stop 44 by a lens 46. Lens 46 is adjusted so that the center of the signal 18 is positioned on the pinhole 48. The intensity of the portion of signal 18 passing through the pinhole 48 is detected by a photomultiplier 50. A phase sensitive detection means 52, such as a lock-in amplifier, is adapted to receive the signal from the photomultiplier 50 and detect the intensity variation of the fringe appointed for analysis. The output of the phase sensitive detection means 52 is displayed by an indicating and recording means 54, which can comprise an oscilloscope and a chart recorder.

In FIG. 3, the interferometric means 16 and the modulating means 42 are shown in greater detail. The interferometric means shown is a Fabry-Perot Interferometer (FPI) which is scanned by varying the phase difference, $\phi$, between interfering beams of light in a conventional way. Scanning methods such as those wherein the pressure of gas between the mirror of the FPI is altered so as to change the optical path therebetween can also be used. Accordingly, interferometric means 16 shown in FIG. 3 should be interpreted as illustrative and not in a limiting sense. Such means has cylindrical air bearings 56 and 58 which normally operate at about 30 psi and collectively support a hollow metal cylinder 60 aproximately 35 cm. long and constructed of stainless steel or the like. The outer diameter of the cylinder 60 is centerless ground to about 4 cm. The inner diameter of the cylinder 60 is about 3.5 cm. Each of the air bearings 56 and 58 is about 8 cm. long and has outer and inner diameters of about 5 cm. and about 4 cm., respectively. The separation between centers of the air bearings is approximately 20 cm. One of the mirrors 62 of the interferometric means 16 is fixedly mounted on end 64 of cylinder 60 as by a suitable adhesive or the like. The plane surface of the mirror 62 is substantially perpendicular to the rotational axis of the cylinder. The other mirror 66 is fixedly mounted to the modulating means 42 as hereinafter described. Each of the air bearings 56 and 58 rests in precise V-blocks of a base plate (not shown) treated so as to dampen external vibrations. The light 14 to be analyzed enters the interferometric means 16 at end 68 of cylinder 60. A carriage 70 caused to move horizontally by means of a precision screw 72 and having a coupling arm 82 fixedly secured thereto by mechanical fastening means, such as screws 88, and to cylinder 60 as described hereinafter provides the cylinder 60 with the linear motion needed to scan the interferometric means 16. Precision screw 72 is coupled to a digital stepping motor 74 through gear assembly 76. The scan rate of the interferometer is controlled either by changing the gear ratio of assembly 76, as by means of magnetic clutches or the like, or by varying the pulse rate input to the digital stepping motor 74. With apparatus of the type described the scan rate can be varied over a range as great as $10^6$ to 1 or more.

In order to transmit precisely the linear motion to cylinder 60, a collar 78 having glass plate 80 adhesively secured thereto, is fixedly attached to the cylinder 60. The coupling arm 82 has a ball 86 comprised of stainless steel, or the like, associated with an end 84 thereof. A permanent magnet 90 is attached to end 84 of coupling arm 82 near the ball 86. Due to the magnetic attraction between the collar 78 and the magnet 90, the ball is held in contact with the glass plate 80. A low friction contact point is thereby provided. The contact force produced at such contact point by linear movement of the carriage 70 can be adjusted either by varying the separation between the magnet 90 and the collar 78, or by decreasing the strength of the magnet 90.

A sectional view of one form of modulating means 42 is shown in FIG. 3. Other forms of the modulating means 42 can also be used. Preferably, the modulating means 42 has a hollow cylindrical body 92 of piezoelectric ceramics. The inner and outer wall 94 and 96 of the cylindrical body 92 are coated with an electrically conductive material such as silver or the like.

Insulating members 98 and 100 comprised of an insulating material such as ceramic or the like are secured to the cylindrical body 92, at ends 102 and 104, respectively, by a suitable adhesive such as an epoxy resin. Mirror 66 is fixedly attached to insulating member 98 by an adhesive of the type used to secure mirror 62 to the end 64 of cylinder 60. In order that mirror 66 be maintained in parallel with mirror 62, the insulating member 100 is adhesively secured to face 106 of holding member 108. The outer face 110 of the holding member 108 has connected thereto a plurality of differential screw micrometers 112, which can be adjusted in the conventional way to provide for precise angular alignment of the mirror 66. Electrodes 114 and 116 are attached to the inner wall 94 and the outer wall 96, respectively. Voltage having a wave form such as a sine wave or a square wave impressed thereon is applied from a high voltage low current power supply 101 to the electrodes 114 and 116. Upon application of the voltage the cylindrical body 92 is caused to modulate in a linear direction whereby the intensity of signal 18 is varied. When the voltage applied from power supply 101 to electrodes 114 and 116 has the form of a square wave, the voltage limits of the wave form can be adjusted so that the intensity of the split-fringe to be analyzed from signal 18 alternates between the maximum values of the branches. A detection means is provided for determining the photon cokunt at the peak of each branch of the split-fringe for each halfcycle of the square wave to produce first and second signal counts, accumulating the signal counts for a preselected period of time over a preselected number of cycles of the square wave and dividing the first signal count by the second signal count to produce a signal count ratio, the preselected time period and preselected number of cycles varying inversely with the branch intensities of said split-fringe. As a result, the accuracy of the detecting means and hence the sensitivity of the apparatus 10 is increased by a factor in the order of about 100 or more.

The apparatus 10 which has been disclosed herein can, of course, be modified in numerous ways without departing from the scope of the invention. For example, interferometric means 16 can be a fixed etalon tuned by controlling the temperature thereof. One type of fixed etalon which is suitable is comprised of optically transparent material, such as fused silica, having opposed surfaces which are polished, flat, parallel and coated with silver, dielectric material or the like for high reflectivity at a preselected frequency region. The thickness of the etalon can be chosen so that the free spectral region of the etalon departs from an old integral submultiple, $n$, of the frequency difference between adjacent spectral components of the periodic spectrum of a molecular species of the gaseous material by the preselected frequency spacing, thereby producing a slit-fringe containing first and second branches of the components. Fine tuning of the solid etalon is affected by providing means for controlling the temperature, and hence the optical path length, thereof so as to cause the transmission peaks for adjacent nth orders to substantially coincide with the spectral lines of either branch of the components. As previously noted, the light 14 to be analyzed need not be Raman scattered light solely but can be any light from the visible, infrared or ultraviolet frequency regions which has spectral components periodic in frequency. The increased sensitivity of the apparatus makes it especially suited for temperature measurement at distant locations of gaseous material. Hence, the gaseous material need not be located within a sample compartment, but may instead be located at points distant from the apparatus 10, as in the order of up to about ten miles distance therefrom. Other similar modifications can be made which fall within the scope of the present invention. It is, accordingly, intended that all matter contained in the above description and shown in the accompanying drawings be interpreted as illustrative and not in a limiting sense.

In operation of the preferred apparatus, light 14 produced by scattering in gaseous material and having spectral components periodic in frequency is collected, collimated and transmitted by light conditioning means 12 to interferometric means 16. The interferometric means 16 receives the light 14, selectively separates therefrom preselected periodic spectra, and transmits the spectra in the form of a split-fringe containing first and second branches of the components and providing a detectable signal correlated with the temperature of the gaseous material. A modulating means 42 operates to modulate the phase difference of the primary interferometric means so as to compare the peak intensities of each branch of the split-fringe. The intensity ratio (or, alternatively, the frequency difference between preselected portions) of the branches of the split-fringe is detected by a phase sensitive detection means 52. The resultant signal from the phase sensitive detection means 52 is displayed by the indicating and recording means 54.

Having thus described the invention in rather full detail, it will be understood that these details need not be strictly adhered to but that various changes and modifications may suggest themselves to one skilled in the art, all falling within the scope of the present invention as defined by the subjoined claims.

I claim:

1. Apparatus for determining the temperature of a gaseous material by analyzing light having spectral components periodic in frequency, comprising:
    a. light conditioning means for collecting, collimating and transmitting said light; light for selectively separating periodic spectra therefrom and transmitting said spectra in the form of a detectable signal, said interferometric means having interference-producing means for providing a plurality of transmission windows regularly spaced in frequency, the frequency spacing between adjacent windows being adjusted to depart from an odd integral submultiple, $n$, of the frequency difference between adjacent spectral components of the periodic spectrum of said gaseous material, said odd integral submultiple being at least three so as to produce a split-fringe containing first and second branches of the components, and scanning means for causing the transmission peaks for adjacent nth orders to substantially coincide with the spectral lines of either branch of the components, whereby each branch of said split-fringe is derived from a plurality of periodic spectral lines and has an integrated intensity substantially equal to their sum;

c. signal conditioning means for measuring the frequency difference between preselected portions of each of said branches; and d. detecting means for indicating and recording the frequency difference between said preselected portions of the branches, said frequency difference between said preselected portions correlating with the temperature of said gaseous material.

2. Apparatus as recited in claim 1, wherein said preselected portions are the peaks of said branches of said split-fringe.

3. Apparatus as recited in claim 1, wherein said signal conditioning means includes modulating means for modulating the phase difference between interfering rays of said light so as to compare the locations of said preselected portions of said branches of said split-fringe, said modulating range being no greater than the frequency spacing between adjacent orders, and synchronous detection means for detecting the frequency difference between said preselected portions of said split-fringe.

4. Apparatus as recited in claim 3, wherein said modulating means has a modulating range substantially equal to the frequency difference between peak intensity portions of said branches of said split-fringe.

5. Apparatus as recited in claim 3, wherein said modulating means is a piezoelectric cylinder and said synchronous detection means is a phase-sensitive detection system.

6. Apparatus as recited in claim 5, wherein said interferometric means is a solid etalon having temperature control means associated therewith for adjusting the optical path length thereof.

7. Apparatus as recited in claim 3, including means for applying to said cylinder a voltage having a square wave form, the limits of said voltage being adjusted so that the intensity of said split-fringe alternates between the maximum values of said branches, means for determining for each half-cycle of said voltage the photon count at the peak intensity of each branch of said split-fringe to produce first and second signal counts, means for accumulating the signal counts for a preselected period of time over a preselected number of cycles of said square wave, and means for dividing the first signal count by the second signal count to produce a signal count ratio.

8. Apparatus as recited in claim 7, including means for varying the preselected period of time and the preselected number of cycles inversely with the branch intensities of said split-fringe.

9. Apparatus as recited in claim 5, wherein said phase sensitive detection system is a lock-in amplifier.

10. Apparatus as recited in claim 5, wherein said synchronous detection means is a photon counting system.

11. Apparatus as recited in claim 2, including light source means for generating monochromatic light, and projecting means for directing said monochromatic light through said gaseous material to produce said scattered light having spectral components periodic in frequency.

12. Apparatus as recited in claim 11, wherein said light source means is provided with means for projecting light having a line width and frequency stability about equal to or less than the instrumental width of said interferometric means.

13. Apparatus as recited in claim 11, wherein said light source means is a pulsed laser.

14. Apparatus as recited in claim 13, wherein said laser is associated with a time gated electronic detection system having (1) means for measuring the time interval required to send a pulse from said laser into said gaseous material and receive a return signal caused by light scattered therein and (2) means for measuring the amplitude of said return signal.

15. Apparatus as recited in claim 12, wherein said interferometric means is a Fabry-Perot interferometer.

16. A method of determining the temperature of gaseous material by analyzing light having spectral components periodic in frequency, comprising the steps of:

a. collecting, collimating and transmitting said light in the form of a ray path;

b. interferometrically separating periodic spectra from said light by directing said light through a plurality of transmission windows regularly spaced in frequency, the frequency spacing between adjacent windows being adjusted to depart from an odd integral submultiple, n, of the frequency difference between adjacent spectral components of the periodic spectrum of said gaseous material so as to product a split-fringe containing first and second branches of the components, and scanning said ray path to cause the transmission peaks for adjacent nth orders to substantially coincide with the spectral lines of either branch of the components;

c. transmitting a detectable signal composed of said split-fringe, each branch of said split-fringe being derived from a plurality of periodic spectral lines and having an integrated intensity substantially equal to their sum;

d. measuring the frequency difference between preselected portions of each of said branches; and detecting and recording the frequency difference between said preselected portions of the branches, said frequency difference bedtween said preselected portions correlating with the temperature of said gaseous material.

17. A method as recited in claim 16, wherein said gaseous material comprises a mixture of gases and said preselected spectra are the spectra of a major constituent thereof.

18. A method as recited in claim 17, wherein said gaseous material is air.

* * * * *

UNITED STATES PATENT AND TRADEMARK OFFICE
CERTIFICATE OF CORRECTION

PATENT NO. : 4,018,529

DATED : April 19, 1977

INVENTOR(S) : Joseph J. Barrett

It is certified that error appears in the above-identified patent and that said Letters Patent are hereby corrected as shown below:

Column 2, line 12 "slit-fringe" should be -- split-fringe --.

Column 3, line 4, the formula should read: -- $\dfrac{n}{8\mu(B \pm 60B^2/\omega_0)}$ --.

Column 3, line 5 delete the "$\phi$".

Column 3, line 19 "frist" should be -- first --.

Column 4, line 47 "spirit-fringe" should be -- split-fringe --.

Column 4, line 51 "or" should be -- for --.

Column 5, line 27 "aparatus" should be -- apparatus --.

Column 6, line 8 "1/8" should be -- $\phi$ --.

Column 6, line 14 "1/8" should be -- $\phi$ --.

Column 6, line 15 "1/8" should be -- $\phi$ --.

Column 6, line 20 "row" should be -- ror --.

Column 6, line 20 "FPi" should be -- FPI --.

Column 6, line 24 "$\Delta F$" should be -- $\Delta f$ --.

Column 8, line 54 "N≡" should be -- Nγ --.

Column 8, line 57, in the formula "≤" should be -- $\leqq$ --.

Column 8, line 57, in the formula "$[2\gamma F_D]^-{}_1$" should be -- $[2\gamma F_D]^{-1}$ --.

Column 9, line 1, in the formula "≤" should be -- $\leqq$ --.

Column 9, line 4 delete "a" after "as".

Column 9, line 17, in the formula "(4 en 2)" should be -- (4 ln 2) --

Column 9, line 25, in the formula "$[4(\omega_0^2 + \omega_0 \omega_R) \sin^2 \frac{\phi}{2} + \omega_R^2]$"

CONTINUED ON PAGE 2

UNITED STATES PATENT OFFICE
CERTIFICATE OF CORRECTION

Patent No. 4,018,529    Dated April 19, 1977

Inventor(s) Joseph J. Barrett

It is certified that error appears in the above-identified patent and that said Letters Patent are hereby corrected as shown below:

Column 9, line 25 (continued) should be -- $[4(\omega_0^2 + \omega_0 \omega_R) \sin^2 \frac{\phi}{2} + \omega_R^2]$ --.

Column 9, line 54 "$[-\pi\Delta_p X]$" should be -- $[-\pi\Delta\omega_p X]$ --.

Column 10, line 13 through 15, delete "The open circles represent the calculated are shown in FIG. 5."

Column 11, line 22 "betwen" should be -- between --.

Column 11, line 30 delete "b".

Column 12, line 21 "aproximately" should be -- approximately --.

Column 13, line 57 "region" should be -- range --.

Column 13, line 57 "old" should be -- odd --.

Column 13, line 62 "slit-fringe" should be -- split-fringe --.

CONTINUED ON PAGE 3

UNITED STATES PATENT OFFICE
CERTIFICATE OF CORRECTION

Patent No. 4,018,529  Dated April 19, 1977

Inventor(s) Joseph J. Barrett

It is certified that error appears in the above-identified patent and that said Letters Patent are hereby corrected as shown below:

Column 14, Claim 1, line 48 after "light;" add -- (b) interferometric means adapted to receive said --.

Column 14, Claim 1, line 59 after "three" add a comma.

Column 16, Claim 15, line 19 "12" should be -- 2 --.

Column 17, Claim 16, line 35 "product" should be -- produce --.

Signed and Sealed this

Twenty-first Day of March 1978

[SEAL]

Attest:

RUTH C. MASON
Attesting Officer

LUTRELLE F. PARKER
Acting Commissioner of Patents and Trademarks